Sept. 28, 1965         J. A. CEBAT         3,208,762
                         SKI-SLED
Filed June 9, 1964                    2 Sheets-Sheet 1
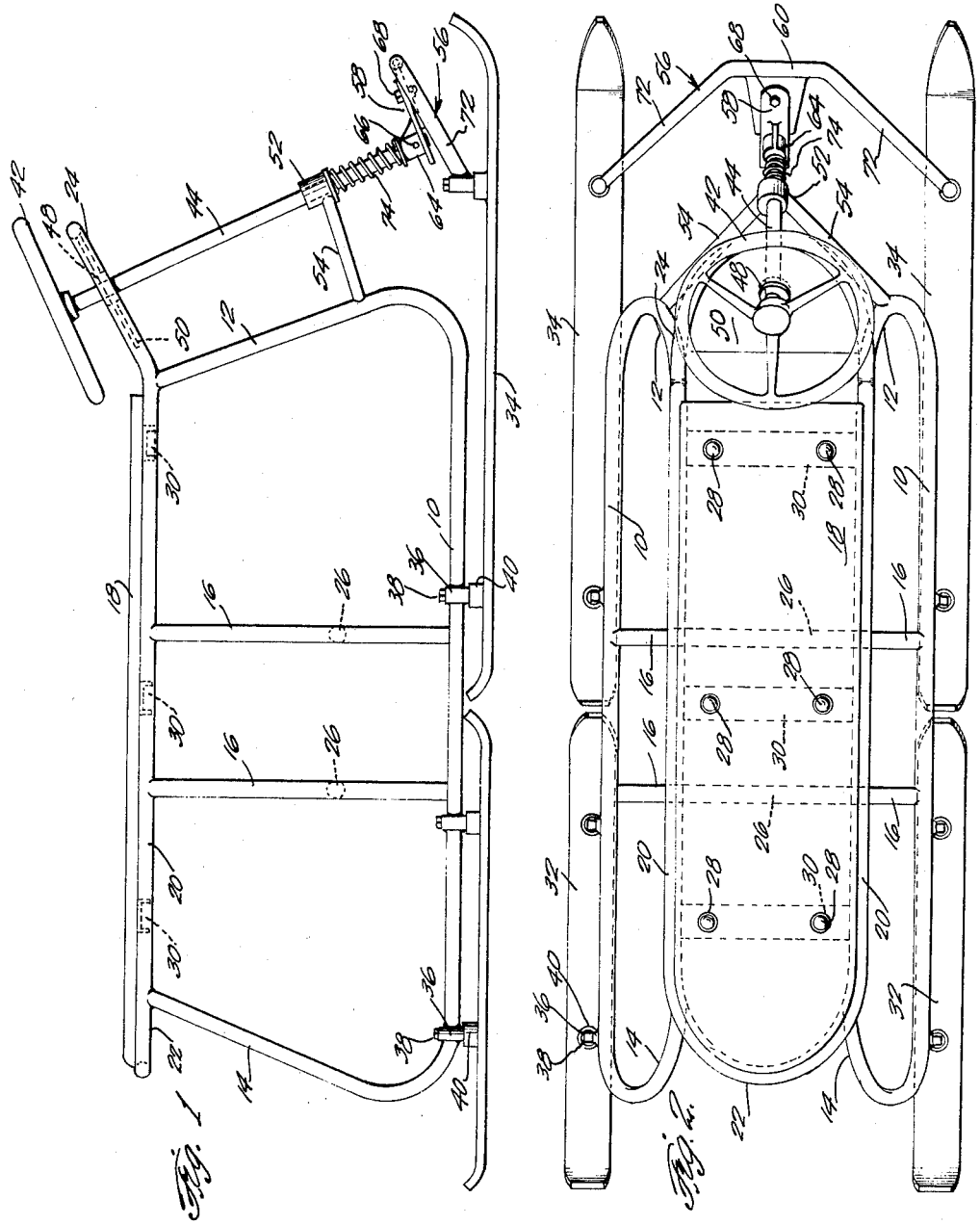
INVENTOR.
JOHN A. CEBAT
BY
McMorrow, Berman & Davidson
ATTORNEYS

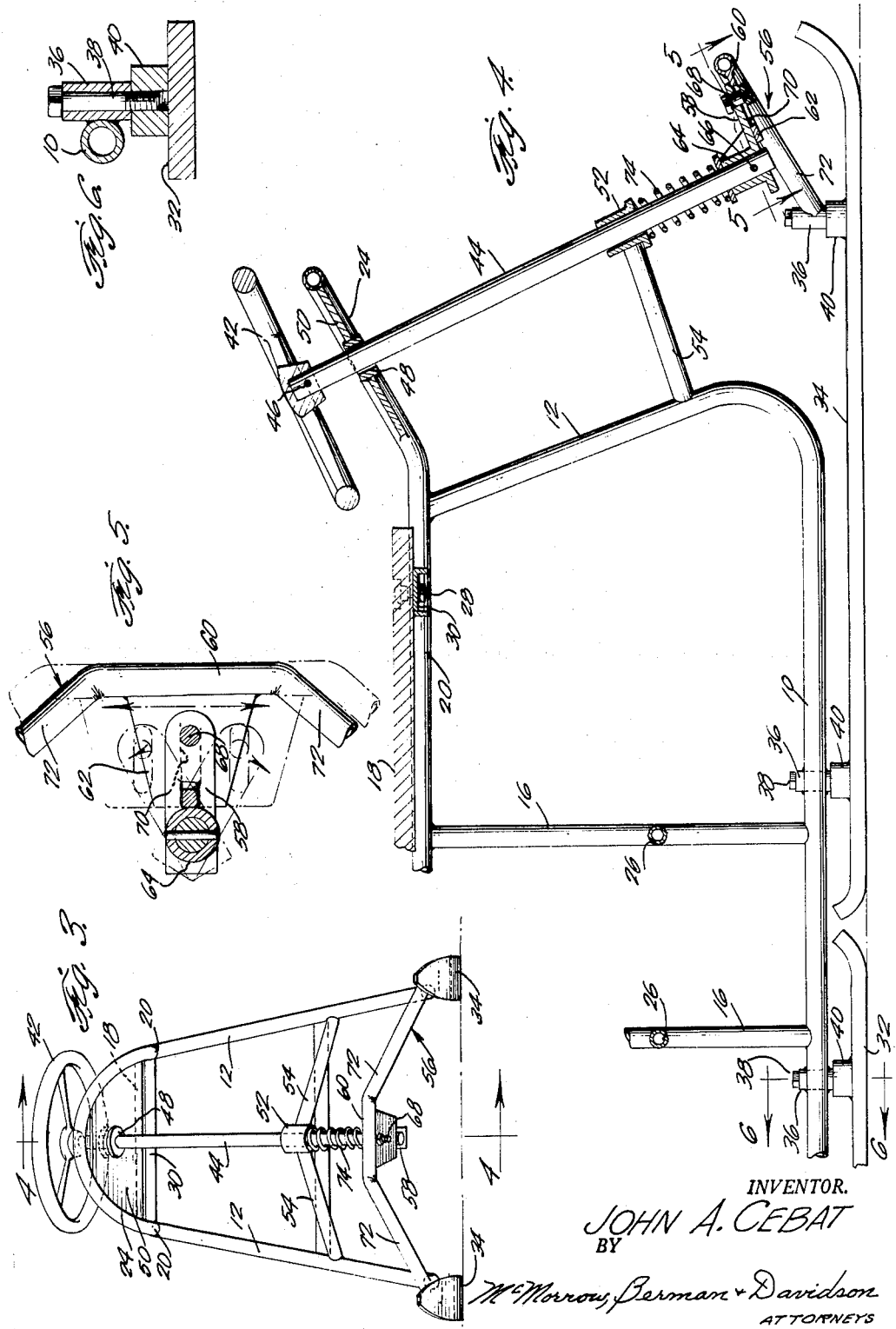

United States Patent Office 3,208,762
Patented Sept. 28, 1965

3,208,762
SKI-SLED
John A. Cebat, 7916 W. 112th Place, Palos Hills, Ill.
Filed June 9, 1964, Ser. No. 373,631
12 Claims. (Cl. 280—16)

This invention relates to a sled, and in particular to a dirigible bobsled having ski-type runners, and it is a general object of the invention to produce such a sled.

A more particular object is to provide a bobsled with a steering system which is biased to a neutral, forward position by the structure and natural resilience of material of the sled.

The objects also include provision of a sled which is simple of structure, easy of manufacture, and low in cost, yet rugged, durable, and dependable in use.

These and other objects, which will be apparent, are attained by the present invention, a preferred form of which is described in the following specification, as illustrated in the drawing, in which:

FIGURE 1 is a side elevational view of a sled constructed according to the invention, FIGURE 2 is a top plan view of the sled shown in FIGURE 1, FIGURE 3 is a front elevational view of the sled shown in FIGURE 1, FIGURE 4 is a fragmentary view, on enlarged scale, of the front end of the sled shown in FIGURE 1, with certain parts shown in section, FIGURE 5 is a sectional view, enlarged through part of the steering system, taken on the plane of the line 5—5 of FIGURE 4, and FIGURE 6 is a sectional view, enlarged, through one of the attachment units for the runner, taken on the plane of the line 6—6 of FIGURE 4.

Referring to the drawings by characters of reference there is shown a sled having a main frame of tubular members, with two, upwardly and inwardly slanting side sections, each having a bottom, horizontal portion, 10, a rearwardly swept, front upright 12, and a forwardly swept, rear upright 14. Near its center, each side has a pair of vertical uprights 16. All uprights have the same effective, vertical heights, so that they terminate in a common, horizontal plane, to accommodate the seat. The actual part of the frame supporting the board or plank seat 18 is a closed loop of tubing, having parallel side sections 20, welded to the top of the uprights, and having a semi-circular rear end section 22, and an upswept, semi-circular front end section 24, which, as will be seen, forms a support for one of the steering column bushings. The central uprights 16 have horizontal cross braces 26. The seat board 18 is secured by bolts 28, to inverted channels 30, welded to, and spanning the upper, side sections 20 of the frame.

The runners comprise a pair of fixed, rear skis 32, and a pair of dirigible, front skis 34. The manner of attachment of the rear skis will be clear from FIGURE 6, wherein the lower, frame section 10 is shown as welded, tangentially to the side of a short tube 36, which in turn is secured by a bolt 38, threadedly secured in a wider tube 40, which is welded to the top of ski 32. As shown, the skis are metallic throughout, but it will be understood that they may comprise metal strips secured to runners of some other material. The fasteners are four in number for the fixed pair of rear skis, and a pair of similar fasteners are employed at the rear of the front skis 34.

Steering through the front pair of skis 34 is effected through a system of limited action, controlled by a steering wheel 42, keyed to a slanted steering column 44, as by a pin 46, the steering column being supported in a pair of axially aligned bushings, comprising an upper bushing 48, fixed centrally of a web plate 50 in the front loop 24 of the seat-holding, upper part of the frame, and a lower bushing 52, carried at the outer ends of a pair of diagonal braces 54, the inner ends of which are welded to the front uprights 12 of the frame.

The steering connection to the front runners comprises a connecting bridge 56 between the front runners, and a lever 58 carried by the steering column 44, and connected to, and adapted to swing said bridge. For this connection, the bridge 56, which is generally V-shaped, with a flat, central, portion 60, and with end connections on the tubes 36, has a central plate 62 extending within the arms of the V bridge, and near the central plane thereof, being perpendicular to the axis of steering column 44.

The lever 58, which is carried by, and extends from a sleeve 64, keyed to the lower end of shaft 44 by a pin 66, has an aperature in its outer portion, receiving a pivot bolt 68, and plate 62 of the bridge has an elongate aperture, or slot 70, also receiving pivot bolt 68, and allowing for sliding movement thereof, during swing of the lever 58 carried by the steering column 44, and connected about bolts 38, such swing requires that the runners vary in respect to the lateral distance between this. This can only take place by flexure of the divergent arms 72 of bridge 56, which results in a sturdy steering system, which is not easily disturbed accidentally, or due to momentary inattention of the operator, and on which the restoring force lies in the natural resilience of the bridge member.

In order to absorb shocks a coiled, compression spring 74 is provided in surrounding relation to column 44, between bushings 52 and 64, and bushing 52 fits loosely on the column 44 to permit free sliding movement up and down of the column.

While a certain, preferred embodiment has been shown and described, various modifications will be apparent, in the light of this disclosure, and the invention should not, therefore, be deemed as limited, except insofar as shall appear from the spirit and scope of the appended claims.

What is claimed is:

1. A dirigible ski sled comprising a tubular framework with uprights supporting a plank seat, a rear pair of skis fixedly carried by said framework, a front pair of skis mounted on said framework for swinging movement, a steering column connected to said front pair of skis to communicate swinging movement thereto, means to rotate said column, said pair of skis being mounted to said framework near their rear ends and connected by a bridge near their front ends, and a swinging lever carried by said steering column, and connected to said bridge through a pivot pin, movable in an elongate slot on said bridge.

2. A device as in claim 1, said bridge comprising tubular stock, and having a pair of diverging arms with ends secured to said front pair of skis.

3. A device as in claim 2, said bridge having a plate extending between said diverging arms and having said elongate slot.

4. A dirigible ski sled comprising a tubular framework with uprights supporting a plank seat, a rear pair of skis fixedly carried by said framework, a front pair of skis mounted on said framework for swinging movement, a steering column connected to said front pair of skis to communicate swinging movement thereto, and means to rotate said column, a bridge connecting the front pair of skis, and having a lever connection with said steering column, said bridge being arranged for flexure, to accommodate approach of said front pair of ski during swing.

5. A device as in claim 4, said bridge having diverging arms, with outer ends connected to the respective, front skis.

6. A dirigible ski sled comprising a tubular framework with uprights supporting a plank seat, a rear pair of skis fixedly carried by said framework, a front pair of skis mounted on said framework for swinging movement, a steering column connected to said front pair of skis to communicate swinging movement thereto, means to rotate said column, bushing means for said steering column carried by said framework, a bridge between said front pair of skis, a lever carried by said steering column and carrying a pin engaging an elongate slot in said bridge, and spring means on said steering column, between said lever and the lowermost of said bushing means.

7. A device as in claim 6, said framework comprising longitudinal lower members and converging end uprights, a closed loop element supported on said uprights, and having an upwardly swept, front section, and cross members on said loop element, supporting said seat.

8. In a device as in claim 7, a bushing carried by said front section, a pair of converging members carried by the foremost of said uprights, a bushing carried by said converging members, and said steering column slidably and rotatably mounted in said bushings.

9. A device as in claim 8, said uprights comprising intermediate, side members, converging upwardly in planes transverse to the framework.

10. In a device as in claim 8, spring means between said front pair of skis and the lowermost of said bushings.

11. A dirigible ski sled comprising a framework, a rear pair of skis fixedly carried by said framework, a front pair of skis connected near their rear ends to said framework, a bridge disposed forwardly of and connecting the front ends of said front pair of skis together, a steering column rotatably supported in said bridge, a lever connected to the lower end of said steering column for rotary movement with said steering column, and means connecting said lever to said bridge for sliding movement responsive to rotary movement of said lever.

12. The ski sled according to claim 11, which includes in addition a steering wheel on the upper end of said steering column for rotating said column.

References Cited by the Examiner
UNITED STATES PATENTS

| | | | |
|---|---|---|---|
| 1,483,183 | 2/24 | Lindberg | 280—16 |
| 2,222,678 | 11/40 | Mittleburg et al. | 280—16 |
| 2,711,326 | 6/55 | Sorensen | 280—16 |
| 3,147,019 | 9/64 | Van Tress et al. | 280—16 |

FOREIGN PATENTS

| | | |
|---|---|---|
| 90,235 | 9/37 | Sweden. |
| 221,484 | 8/42 | Switzerland. |

ARTHUR L. LA POINT, *Primary Examiner.*